(12) United States Patent
Jones et al.

(10) Patent No.: US 12,505,932 B2
(45) Date of Patent: Dec. 23, 2025

(54) BETAVOLTAIC DEVICES

(71) Applicant: GenX Energy Pty Ltd., Adelaide (AU)

(72) Inventors: Bryn Jones, Littlehampton (AU); Julian Frederick Kelly, Robe (AU)

(73) Assignee: GENX ENERGY PTY LTD, Adelaide (AU)

(*) Notice: Subject to any disclaimer, the term of this patent is extended or adjusted under 35 U.S.C. 154(b) by 219 days.

(21) Appl. No.: 17/612,704

(22) PCT Filed: May 21, 2020

(86) PCT No.: PCT/AU2020/050502
§ 371 (c)(1),
(2) Date: Nov. 19, 2021

(87) PCT Pub. No.: WO2020/232507
PCT Pub. Date: Nov. 26, 2020

(65) Prior Publication Data
US 2022/0238244 A1    Jul. 28, 2022

(30) Foreign Application Priority Data

May 21, 2019 (AU) ................................. 2019901722
May 21, 2019 (AU) ................................. 2019901723

(51) Int. Cl.
*G21H 1/02* (2006.01)
*C08K 3/16* (2006.01)
*C08L 77/02* (2006.01)

(52) U.S. Cl.
CPC ............... *G21H 1/02* (2013.01); *C08K 3/16* (2013.01); *C08L 77/02* (2013.01); *C08K 2201/001* (2013.01); *C08L 2203/20* (2013.01)

(58) Field of Classification Search
CPC ...... G21H 1/02; C08K 3/16; C08K 2201/001; C08L 77/02; C08L 2203/20; C08L 79/02
See application file for complete search history.

(56) References Cited

U.S. PATENT DOCUMENTS 3,000,092 A     9/1961    Scuro
5,087,533 A     2/1992    Brown
(Continued)

FOREIGN PATENT DOCUMENTS

CN     1870302          11/2006
CN     102422363 A       7/2014
(Continued)

OTHER PUBLICATIONS

Science Direct Journal (Year: 2024).*
(Continued)

*Primary Examiner* — Christopher M Koehler
*Assistant Examiner* — Viswanathan Subramanian
(74) *Attorney, Agent, or Firm* — Klarquist Sparkman, LLP

(57) ABSTRACT

The present disclosure relates to devices for generating electrical energy, methods for generating electrical energy, products for use in devices for generating electrical energy and methods for producing devices for generating electrical energy. In certain embodiments, the present disclosure provides an electrical energy generating device, the device comprising at least one cell comprising: first and second spaced electrodes, the first electrode comprising a low work function material and the second electrode comprising a high work function material; and disposed between the first and second electrodes, beta particle emitting radionuclides and a semiconducting material, the semiconducting material capable of producing electron hole pairs in response to beta particle emission from the radionuclides.

16 Claims, 2 Drawing Sheets

(56) References Cited

U.S. PATENT DOCUMENTS

| | | | |
|---|---|---|---|
| 6,118,204 | A | 9/2000 | Brown |
| 8,691,404 | B2 | 4/2014 | Kwon et al. |
| 10,083,770 | B2 | 9/2018 | Kwon et al. |
| 2008/0001497 | A1 | 1/2008 | Wong et al. |
| 2008/0200628 | A1 | 8/2008 | Gadeken et al. |
| 2009/0158750 | A1 | 6/2009 | Rubin |
| 2009/0179155 | A1* | 7/2009 | Weinberg ............... G01T 1/242 250/370.01 |
| 2010/0126548 | A1 | 5/2010 | Jang et al. |
| 2014/0159541 | A1* | 6/2014 | Kwon ..................... G21H 1/06 310/301 |
| 2015/0041782 | A1* | 2/2015 | Chery ................. H10K 50/856 257/40 |
| 2017/0032862 | A1* | 2/2017 | Kwon ..................... G21H 1/06 |
| 2019/0013352 | A1 | 1/2019 | Boyd |

FOREIGN PATENT DOCUMENTS

| | | |
|---|---|---|
| CN | 107093486 A | 1/2018 |
| JP | H06151978 | 5/1994 |
| JP | 2007-266587 A | 10/2007 |
| JP | 2016219609 | 12/2016 |
| JP | 2018019042 | 2/2018 |
| KR | 2012-0024075 A | 3/2012 |
| KR | 20180020411 | 2/2018 |
| WO | WO 2015/157764 | 10/2015 |
| WO | WO 2016/090087 | 6/2016 |

OTHER PUBLICATIONS

Zhang et al., "A Betavoltaic Microbattery Using Zinc Oxide Nanowires Under Build in Potential Difference," *MEMS 2016*, Shanghai, China, pp. 1177-1180, Jan. 24-28, 2016.

Extended European Search Report for International Application No. PCT/AU2020050502, dated Aug. 16, 2023 (8 pages).

English Translation of Israeli Examination Report dated Aug. 29, 2023, from the related Israeli Application No. 288238 (4 pages).

English Translation of Russian Examination Report dated Sep. 19, 2023, from related Russian Application No. 2021137660 (6 pages).

Boeva et al., "Polyaniline: Synthesis, Properties and Application," *Polymer Science*, Ser. C, 56(1):144-153, Jul. 20, 2014.

Extended European Search Report for International Application No. PCT/AU2021051044, dated Aug. 13, 2024 (15 pages).

Fraas, "Economic Potential for Thermophotovoltaic Electric Power Generation in the Steel Industry," 40th IEEE Photovoltaic Specialists Conference, Colorado Convention Center, Jun. 2014, 5 pages.

Hussein et al., "Thermoelectric Characterization of Thallium Gallium Disulphide," *JKAU: Sci.*, vol. 25 No. 1, pp. 3-14 (2013 A.D./1434 A.H.), DOI: 10.4197/Sci. 25-1.1.

International Preliminary Report on Patentability issued for International Application No. PCT/AU2021/051044 on Jan. 11, 2023.

International Search Report and Written Opinion issued for International Application No. PCT/AU2021/051044 on Oct. 27, 2021.

Kroon et al., "Thermoelectric plastics: from design to synthesis, processing and structure-property relationships," *Chem. Soc. Rev.*, 2016, 45, 6147 (Year: 2016), 18 pages.

Olsen, L.C., "Review of Betavoltaic Energy Conversion," *NASA*. Lewis Research Center, Proceedings of the 12th Space Photovoltaic Research and Technology Conference (SPRAT 12), 256-267 (1993).

Snyder, "Small thermoelectric generators," *The Electrochemical Society Interface*, 17(3):54-56, Sep. 2008.

Spieler, H., "Introduction to Radiation Detectors and Electronics," Lawrence Berkeley National Laboratory (1999).

Stejskal et al., "Polyaniline. Preparation of a Conducting Polymer," *IUPAC Technical Report, Pure Appl. Chem.* 74(5):857-867, Jan. 1, 2002.

Ozel et al., "Dielectric and Raman Spectroscopy of TISe Thin Films," *Physica B*, vol. 527, Oct. 12, 2017, pp. 72-77.

Canadian Examination Report dated Sep. 13, 2023, from related Canadian Application No. 3,141,166 (4 pages).

Israeli Examination Report dated Aug. 29, 2023, from related Israeli Application No. 288238 (4 pages).

Russian Examination Report dated Sep. 19, 2023, from related Russian Application No. 2021137660 (9 pages).

Chinese First Examination and Search Report dated Mar. 1, 2025, from related Chinese Application No. 202080052794.X, 10 pages.

Korean Examination Report dated Jan. 24, 2025, from related Korean Application No. 10-2021-7041790, eight pages.

* cited by examiner

BETAVOLTAIC DEVICES

PRIORITY CLAIM

This application is the § 371 U.S. National Stage of International Application No. PCT/AU2020/050502, filed on May 21, 2020, which was published in English under PCT Article 21(2), which in turn claims priority to Australian Provisional Patent Application 2019901722, filed on 21 May 2019 and to Australian Provisional Patent Application 2019901723, filed on 21 May 2019, the contents of both of which are hereby incorporated by reference.

FIELD

The present disclosure relates to devices for generating electrical energy, methods for generating electrical energy, products for use in devices for generating electrical energy and methods for producing devices for generating electrical energy.

BACKGROUND

The use of electrochemical devices for generating electrical energy is widespread. These devices rely on conventional chemical reactions to provide electrical power, but as such are subject to limitations in their useable life in the absence of recharging or refuelling. Rechargeable electrochemical devices are able to extend the useable life of electrochemical energy devices, but also suffer a number of their own limitations, not least that the devices lose their ability to be recharged over time.

Devices that convert ionizing radiation into electrical energy have also been developed. For example, devices that utilise beta radiation for generating electricity have been developed and are usually referred to as "betavoltaic" devices. Such devices have attracted significant interest in fields where long term power output is required, or where it is not practical to change or service the power source.

Given the large amount of waste radionuclides produced by various processes historically and in the future, it would be advantageous to be able to power such devices using the unique energetic particle emissions of these waste radionuclides. This would provide economic and/or environmental benefits associated with utilising the waste radionuclides.

However, while betavoltaic devices have been developed they typically have a number of limitations, such as one or more of low conversion efficiency, low power output and/or reduced lifespan due to radiation damage.

The present disclose relates to betavoltaic devices which are able to utilise a variety of different beta particle emitting radionuclides to generate electricity, and which ameliorate one of more disadvantages of the prior art and/or provide one or more advantages, as discussed herein.

SUMMARY

The present disclosure relates to devices for generating electrical energy, methods for generating electrical energy, products for use in devices for generating electrical energy, and methods for producing devices for generating electrical energy.

Certain embodiments of the present disclosure provide an electrical energy generating device, the device comprising at least one cell comprising:

first and second spaced electrodes, the first electrode comprising a low work function material and the second electrode comprising a high work function material; and disposed between the first and second electrodes, beta particle emitting radionuclides and a semiconducting material, the semiconducting material capable of producing electron hole pairs in response to beta particle emission from the radionuclides.

Certain embodiments of the present disclosure provide a method of generating electricity, the method comprising using an electrical generating device as described herein to generate the electricity.

Certain embodiments of the present disclosure provide a method of generating electrical energy, the method comprising:

producing an electric potential difference between first and second closely spaced electrodes, the first electrode comprising a low work function material and the second electrode comprising a high work function material;

producing electron hole pairs from energetic beta particles emitted from radionuclides in close proximity with a semiconducting material disposed between the first and second electrodes, the electron hole pairs being mobile under the effect of an electric field; and capturing the electron hole pairs into an external circuit using the electric field existing between the electrodes; thereby generating electrical energy.

Certain embodiments of the present disclosure provide a method of generating electrical energy, the method comprising:

producing an electric field between first and second spaced electrodes, the first electrode comprising a low work function material and the second electrode comprising a high work function material, and the electric field being produced due to different Schottky junctions at the two different electrodes;

producing electron hole pairs from energetic beta particles emitted from radionuclides in close proximity with a semiconducting material disposed between the first and second electrodes, the electron hole pairs being mobile under the effect of an electric field; and capturing the electron hole pairs into an external circuit using the electric field existing between the electrodes; thereby generating electrical energy.

Certain embodiments of the present disclosure provide a device for generating electrical energy using a method as described herein.

Certain embodiments of the present disclosure provide a product comprising a first material having a low work function, a second material having a high work function, and disposed between the first material and the second material beta particle emitting radionuclides and a semiconducting material capable of producing electron hole pairs in response to beta particle emission from the radionuclides.

Certain embodiments of the present disclosure provide an electrical energy generating device comprising a product as described herein.

Certain embodiments of the present disclosure provide a method of generating electrical energy, the method comprising using a product as described herein.

Certain embodiments of the present disclosure provide a method of producing an electrical energy generating device, the method comprising incorporating one or more electrical cells into the electrical energy generating device, the one or more electrical cells comprising first and second spaced electrodes, the first electrode comprising a low work function material and the second electrode comprising a high work function material, and disposed between the first and second electrodes, beta particle emitting radionuclides and a semiconducting material, the semiconducting material capable of producing electron hole pairs in response to beta particle emission from the radionuclides.

Certain embodiments of the present disclosure provide an electrical energy generating device produced by a method as described herein.

Other embodiments are disclosed herein.

BRIEF DESCRIPTION OF THE FIGURES

For a better understanding of the present disclosure, and to show more clearly how the present disclosure may be carried into effect according to one or more embodiments thereof, reference will be made, by way of example, to the accompanying figures.

DETAILED DESCRIPTION

The present disclosure relates to devices for generating electrical energy, methods for generating electrical energy, products for use in devices for generating electrical energy, and methods for producing devices for generating electrical energy.

The present disclosure is based on the recognition that electrical energy may be generated using a device utilising a semiconducting material disposed between electrodes with differing work functions and exposing the semiconducting material to beta particle emitting radionuclides. The production of electron hole pairs in the semiconducting material in response to beta particle emission from the radionuclides, in conjunction with the potential difference between the electrodes, generates electrical energy.

Without being bound by theory, the present disclosure is based on an electric potential difference being created between first and second spaced electrodes, by forming differing Schottky junctions at the two different electrodes. Electron hole pairs are produced in a semiconducting material upon excitation by energetic beta particles emitted from radionuclides incorporated into the semiconducting material. Electron hole pairs generated within the material are mobile under the effect of an electric field. The electron hole pairs are swept into an external circuit using the electric potential difference existing between the two differing electrodes, and electrical energy thereby generated.

Certain embodiments of the present disclosure are directed to products and methods that have one or more combinations of advantages. For example, some of the advantages of some of the embodiments disclosed herein include one or more of the following: new and/or improved devices for generating electrical energy; new methods for converting beta emission from radionuclides into electrical energy; using radioactive materials formerly considered as waste products for generating electrical energy; producing devices able to provide electrical power for specialised remote power requirements; producing betavoltaic electrical energy generating devices with improved resistance to radiation induced damage; betavolatic devices that permit the selection of radioactive isotopes with different half-lives to power the devices and thereby achieve different overall longevities required for specific applications; the amenability of the materials used to produce the electrical cells to allow scaleable, automated manufacturing methods; to address one or more problems and/or to provide one or more advantages, or to provide a commercial alternative. Other advantages of certain embodiments of the present disclosure are also disclosed herein Certain embodiments of the present disclosure provide an electrical energy generating device.

Figure 2:
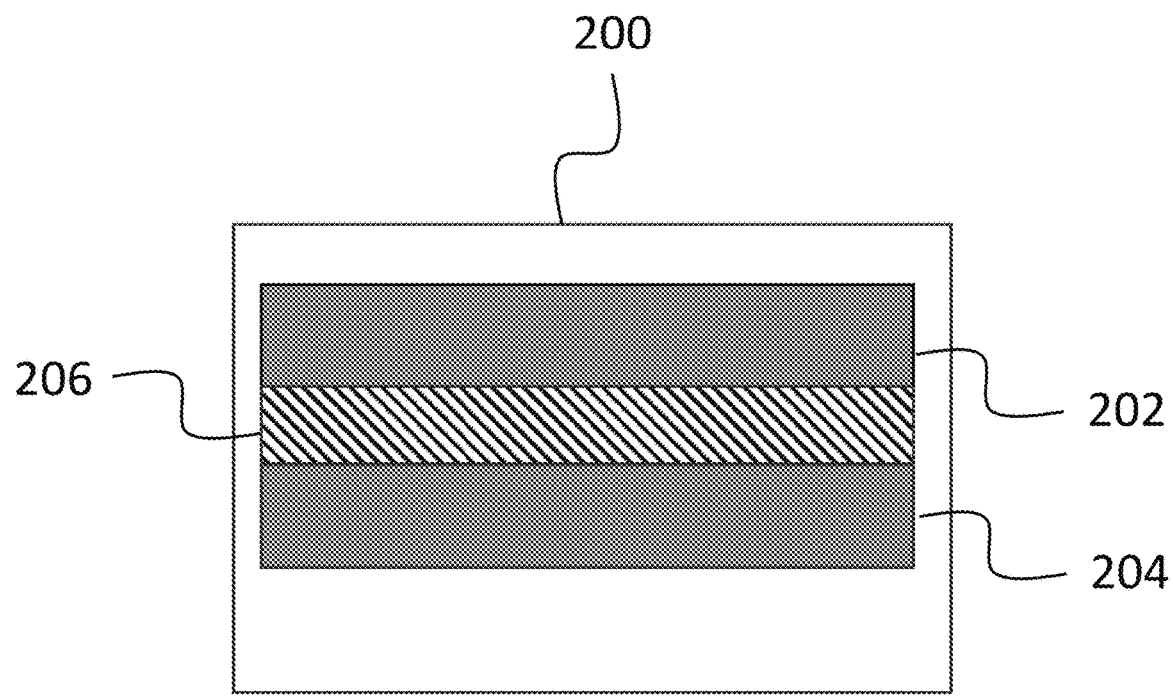
FIG. 2 shows a cell and features thereof according to aspects of the present disclosure.

Certain embodiments of the present disclosure, such as illustrated in FIG. 2, provide an electrical energy generating device, the device comprising at least one cell (200) comprising:

first and second spaced electrodes (202, 204), the first electrode comprising a low work function material and the second electrode comprising a high work function material; and disposed between the first and second electrodes, beta particle emitting radionuclides and a semiconducting material (206), the semiconducting material capable of producing electron hole pairs in response to beta particle emission from the radionuclides.

The term "cell" as used herein refers to a functional unit for generating electrical energy.

In certain embodiments, the device comprises more than one cell. In certain embodiments, the device comprises a plurality of cells. A suitable number of cells may be selected based on the desired characteristics of the device required. Methods for electrically connecting individual cells to achieve current flow are known in the art.

The dimensions of the first and second electrodes may be selected based on the properties of the materials used in the electrodes and the desired characteristics of the electrical energy generating device.

In certain embodiments, the first and second electrodes are separated by a distance in the range from 0.3 to 100 micrometres. In certain embodiments, the first and second electrodes are separated by a distance in the range from 0.5 to 30 micrometres. Other distances are contemplated.

In this embodiment, an inter-electrode electric field is produced between the first and second closely spaced electrodes by virtue of the differing Schottky junctions at each electrode. The Schottky junction formed between the semiconductor and the first electrode comprising a low work function material will have a different barrier height, depletion width and energy profile than that formed at the second electrode comprising a high work function material. Taken together, the electric fields associated with the two differing Schottky junction can reinforce each other to provide a sizable macroscopic field for collecting charge-carriers into an external circuit.

Methods for determining the work function of a material are known in the art and include methods employing electron emission from a sample induced by photon absorption (photoemission), by high temperature (thermionic emission), due to an electric field (field electron emission), or by use of a Kelvin Probe measurement. Relative methods make use of the work function difference between a sample and a reference metal.

In certain embodiments, the first and/or second electrodes comprise a metal. In certain embodiments, the first and/or second electrodes comprise a non-metal. In certain embodiments, the first and/or second electrodes comprise a composite material (eg cermet). In certain embodiments, the first and/or second electrodes comprise a material treated (eg coated) to alter the work function of the electrode.

Low work function materials and high work function materials are commercially available and/or may be produced by a method known in the art.

In certain embodiments, the low work function material comprises a material with a work function of less than 3.0 eV.

In certain embodiments, the low work function material comprises a material with a work function of 2.5 eV or less. In certain embodiments, the low work function material comprises a material with a work function in the range of 2.7 to 3.5 eV.

In certain embodiments, the low work function material comprises a metal and/or an intermetallic compound.

The term "metal" as used herein refers to one or more metals, or a material containing a significant proportion of a metal.

In certain embodiments, the low function material is substantially a pure elemental metal. In certain embodiments, the low function material comprises two or more metals. In certain embodiments, the low function material comprises one or more metals and other materials. In certain embodiments, the low function material is an alloy.

The term "intermetallic compound" as used herein refers to a material composed of two or more elemental metals of defined stoichiometry, and which may also contain other non-metallic elements, for example a material such as $Mg_2Ca$, $Al_2Ca$, $Mg_{17}Al_{12}$.

In certain embodiments, the low work function material comprises a metal and/or a metal containing compound, comprising one or more of europium, strontium, barium, samarium, calcium, magnesium, cerium, sodium, lithium, potassium, rubidium, caesium, dysprosium, neodymium, gadolinium, terbium, holmium, erbium, thulium, lanthanum, scandium, thorium, yttrium, and ytterbium. These low work function materials are commercially available and/or may be produced by a method known in the art.

In certain embodiments, the low work function material comprises samarium metal. Samarium metal is commercially available.

Examples of other low work function materials include Ag—O—Cs, W—O—Ba, $Sc_2O_3$ and $LaB_6$, all of which are commercially available or may be produced by a method known in the art.

In certain embodiments the low work function material comprises a metal. In certain embodiments the low work function material comprises a mixture of metals. In certain embodiments, the low work function material comprises a metal treated (eg coated) with another material to alter the work function of the electrode.

In certain embodiments, the low work function comprises a non-metal.

In certain embodiments, the material with a low work function comprises a composite material. In certain embodiments, the material with a low work function comprises a material treated to alter the work function of the material.

In certain embodiments, the high work function material comprises a material with work function of greater than 4.0 eV. In certain embodiments, the high work function material comprises a chemical element with a work function of greater than 4.0 eV.

In certain embodiments, the high work function material comprises a metal and/or an intermetallic compound.

In certain embodiments, the high function material is substantially a pure elemental metal. In certain embodiments, the high work function material comprises two or more metals. In certain embodiments, the high work function material comprises one or more metals and other materials. In certain embodiments, the high work function material is an alloy.

In certain embodiments, the high work function material comprises a metal selected from one or more of nickel, platinum, silver, gold, aluminium, cadmium, cobalt, chromium, copper, beryllium, bismuth, cadmium, iron, gallium, mercury, indium, iridium, manganese, molybdenum, niobium, osmium, lead, palladium, rhenium, rhodium, ruthenium, antimony, silicon, tin, tantalum, technetium, titanium, vanadium, tungsten, zinc, and zirconium. These high work function materials are commercially available and/or may be produced by a method known in the art.

In certain embodiments, the high work function material comprises nickel metal.

In certain embodiments the material with a high work function comprises a metal. In certain embodiments the material with a high work function comprises a mixture of metals. In certain embodiments the material with a high work function comprises a metal treated with another material to alter the work function of the electrode.

In certain embodiments, the material with a high work function comprises a non-metal.

In certain embodiments, the second electrode comprises a ceramic metal composite (ie a cermet material).

In certain embodiments, the material with a high work function comprises a composite material. In certain embodiments, the material with a high work function comprises a material treated (eg coated) to alter the work function of the material.

Beta particle emitting radionuclides are known in the art are commercially available, and are additionally obtainable from sources deriving from waste radioactive products, by-products of fission reactors, and legacy radionuclides specifically produced for industrial, medical or research purposes.

In certain embodiments, the beta particle emitting radionuclides are derived from a waste radioactive material.

Examples of beta particle emitting radionuclides include one or more of one or more of $^{90}Sr$, $^{99}Tc$, $^{3}H$, $^{14}C$, $^{63}Ni$, $^{137}Cs$, $^{147}Pm$, $^{151}Sm$, $^{121m}Su$, $^{155}Eu$, $^{93}Zr$, $^{126}Su$, $^{60}Co$, $^{210}Pb$, $^{90}Y$, $^{129}I$, $^{188}W$, $^{35}S$, $^{121m}Su$, $^{123}Sn$, $^{45}Ca$, $^{106}Ru$, $^{170}Tm$, $^{171}Tm$, $^{134}Cs$, $^{32}Si$, $^{113}Cd$, and $^{79}Se$. The radionuclides may be provided in a suitable chemical form for use in the various embodiments of the disclosure.

In certain embodiments, the radionuclide comprises one or more of $^{90}Sr$, $^{99}Tc$, $^{3}H$, $^{14}C$, $^{63}Ni$, $^{137}Cs$, $^{147}Pm$, $^{151}Sm$, $^{121m}Su$, $^{155}Eu$, $^{93}Zr$, $^{126}Sn$, $^{60}Co$, and $^{210}Pb$.

In certain embodiments, the radionuclides comprise radionuclides of a single type. In certain embodiments, the radionuclides comprises radionuclides of two or more separate types of radionuclides.

In certain embodiments, the radionuclides comprise an isotope that produces multiple β-particle emissions via its chain of decaying daughter radionuclides as it ultimately decays to a stable isotope/nucleus, such as $^{90}Sr$ and $^{126}Sn$.

It will also be appreciated that a single radioactive beta decay event causes a cascade of secondary electrons extending up to tens of micrometers (μm) from the original decaying atom, and each of the secondary electrons is itself potentially capable of causing multiple excited electronic states within a semiconductor. In addition, it will also be appreciated that the radionuclides may undergo multi-mode emission.

In certain embodiments, the radionuclides have one or more of the following preferred properties: (i) the radionuclides emit β-particles with energies in the range 1-100 kilo electron volts (keV); (ii) the radionuclides emit β-particles at a rate governed by a half-life in the range of 1-40 years, for example ~5 years (to minimise replacement periods); (iii) the radionuclides are an isotope of an element with tractable chemical characteristics; (iv) and the radionuclides emit β-particles with little or no associated gamma (γ) radiation emission.

In certain embodiments, the radionuclides are dispersed in the semiconducting material.

In certain embodiments, the radionuclides are incorporated into the chemical structure and/or the structural framework of the semiconducting material.

In certain embodiments, the radionuclide is incorporated into the semiconducting material at a specific activity in the range from $10^{-1}$ GBq/mm$^3$ to $10^4$ GBq/mm$^3$. A suitable specific activity can be selected based on the desired characteristics of the electrical energy generating device.

In certain embodiments, the semiconducting material comprises a composite semiconducting material.

In certain embodiments, a binder material is utilised to deposit, coat or fuse the semiconducting material to at least one of the electrodes. Methods for depositing, coating or fusion of materials are known in the art.

In certain embodiments, the semiconducting material comprises a single phase composite semiconducting material.

In certain embodiments, the single phase composite semiconductor material comprises an inorganic semiconductor chemically complexed with a polymer.

In certain embodiments, the inorganic semiconductor comprises a band-gap of at least 1.1 eV.

Examples of inorganic semiconductors comprise one or more of a halide and a chalcogenide, which are commercially available or may be produced by a method known in the art.

In certain embodiments, the inorganic semiconductor comprise one or more of a cesium halide, rubidium halide, potassium halide, lead halide, bismuth halide, antimony halide, arsenic halide, telurium halide, tin halide; a telluride of Zn, Cd, Hg, Ga, In, Tl, Ge, Sn, Pb, As, Sb, Bi, Se; a selenide of Zn, Cd, Hg, Ga, In, Tl, Ge, Sn, Pb, As, Sb, Bi, Te; and a sulfide of Zn, Cd, Hg, Ga, In, Tl, Ge, Sn, Pb, As, Sb, Bi, Se.

In certain embodiments, the single phase composite semiconductor material comprises a halide chemically complexed with a polymer. For example, halides may be supramolecularly complexed with nitrogen or sulphur atoms in a polymer.

In certain embodiments, the inorganic semiconductor comprises one or more of $BiI_3$, $PbI_2$, $CsPbBr_3$, $CsPbI_3$, $CsPbCl_3$, $CsSnI_3$, $CsSnBr_3$, and $CsSnCl_3$.

Other inorganic semiconductors include for example of ZnS and/or CdSe, both of which are commercially available and/or may be produced by a method known in the art.

In certain embodiments, the polymer comprises a nylon, a polyimide, a polythiophene, a polypyrrole, a polyacrylonitrile, a polyurethane, a polycarbazole, a polyaniline, a polysulfide, a polysulfoxide, a polythioester, a polythiocarbonate, a polysulfate, a polythiourethane, a polysulfoximine, and a polysulfonium salt, or a mix of one or more of the aforementioned polymers.

In certain embodiments, the single phase composite semiconductor material comprises a polymer and a high concentration of the inorganic semiconductor. For example, the single phase composite semiconductor material may have a concentration of the inorganic semiconductor of at least 50% (w/w), or in the range from 50% to 95% (w/w).

In certain embodiments, the inorganic semiconductor and the radionuclides are distinct species.

In certain embodiments, the inorganic semiconductor comprises the radionuclide. For example, the inorganic semiconductor may be $^{210}PI_2$ and/or $Bi^{129}I_3$. Such compounds may be obtained commercially or produced by a method known in the art.

In certain embodiments, the radionuclide is mixed with the polymer. In certain embodiments, the radionuclide is dispersed with the polymer. In certain embodiments, the radionuclide is located adjacent to the polymer. In certain embodiments, the polymer and the semiconductor are both present in a particulate form, and the particles present in a mixture with the semiconductor.

In certain embodiments, the radionuclides are incorporated into the chemical structure of the polymer. Methods for incorporating radionuclides into polymers are known in the art, and include, for example the use of monomers labelled with an appropriate radionuclide (eg $^3H$ or $^{14}C$) or the use of gaseous forms of a radionuclide (eg tritium gas) which incorporates the radionuclides into the polymer by exchange.

In certain embodiments, the radionuclides are mixed with the polymer. In certain embodiments, the radionuclides are dispersed in the polymer. In certain embodiments, the radionuclides are located adjacent to the polymer. In certain embodiments, the polymer and the radionuclides are both present in particulate form, and the particles present in a mixture with the semiconductor.

In certain embodiments, the radionuclides are incorporated into the chemical structure of the polymer, and the inorganic semiconductor mixed with the polymer.

In certain embodiments, the radionuclides form part of the inorganic semiconductor, and the inorganic semiconductor is mixed with the polymer.

In certain embodiments, the radionuclides, the inorganic semiconductor, and the polymer are each in particulate form and the particles present in a mixture.

In certain embodiments, the radionuclides are incorporated into higher order structures present in a material comprising the inorganic semiconductor, such as incorporation into voids in non-regular structures present in the inorganic semiconductor.

In certain embodiments, the semiconducting material comprises a semiconducting polymer. Semiconducting polymers (and/or their monomeric constituents) are commercially available or may be produced by a method known in the art.

In certain embodiments, the semiconducting polymer comprises one or more of a polythiophene, a polyacetylene, a polyphenylene vinylene, a polypyrrole polyphenylene sulphide, a polyaniline, a polyvinylacetylene, a polypyrrole, a polyindole, a poly vinylene, a poly azulene, and an organo-boron polymer. Examples include P3HT and PEDOT polymers. Other types of polymers are contemplated.

In certain embodiments, the radionuclides are mixed with the semiconducting polymer. In certain embodiments, the radionuclides are dispersed with the semiconducting polymer. In certain embodiments, the radionuclides are located adjacent to the semiconducting polymer. In certain embodiments, the semiconducting polymer and the radionuclides are both present in a particulate form, and the particles present in a mixture with the semiconductor.

In certain embodiments, the radionuclides are incorporated into the chemical structure of the semiconducting polymer. Methods for incorporating radionuclides into polymers are known in the art, and include, for example the use of monomers labelled with an appropriate radionuclide (eg $^3$H or $^{14}$C) or the use of gaseous forms of a radionuclide (eg tritium gas) which incorporates radionuclides into the semiconducting polymer by exchange.

In certain embodiments, the semiconducting material comprises a semiconducting polymer and a further semiconductor.

Examples of further semiconductors comprise one or more of a halide, a chalcogenide, an oxide, a nitride, a carbide, a perovskite, a boride, a telluride, a selenide, an antimonide, a germanide, an arsenide, a sulfide, a silicide, a phosphide, an aluminide, a carbon allotrope, and an intermetallic compound, all of which are commercially available of may be produced by a method known in the art.

In certain embodiments, the further semiconductor comprises one or more $BiI_3$, $PbI_2$, $CsPbBr_3$, $CsPbI_3$, $CsPbCl_3$, $CsSnI_3$, $CsSnBr_3$, and $CsSnCl_3$. Other inorganic semiconductors include for example one or more of $PbZrO_3$, $PbTiO_3$, $SrTiO_3$, $SrZnO_3$, and $(K,Cs)TaO_3$, all of which are commercially available.

In certain embodiments, the semiconducting material comprises the semiconducting polymer and a low concentration of the further semiconductor. For example, the semiconducting material may have a concentration of the further semiconductor of at least 5% (w/w), or in the range from 5% to 50% (w/w) in the semiconducting polymer.

In certain embodiments, the semiconducting material comprises the semiconducting polymer and a further semiconductor, and the radionuclide forms part of the further semiconductor.

In certain embodiments, the semiconducting material comprises the semiconducting polymer and the further semiconductor, and the radionuclide, the further semiconductor, and the semiconducting polymer are each in particulate form and the particles present in a mixture.

In certain embodiments, the semiconducting material comprises the semiconducting polymer and the further semiconductor, and the radionuclide and/or the further semiconductor are dispersed in a matrix of the semiconducting polymer.

In certain embodiments, the semiconducting material comprises a crystalline semiconductor.

In certain embodiments, the crystalline semiconductor comprises one or more of a nitride, a carbide, a halide, a mixed chalcogenide, a telluride, a selenide, an antimonide, a germanide, an arsenide, a silicide, a phosphide, an aluminide, a carbon allotrope, a perovskite or other complex oxo-anion crystal phase material, a simple oxide, a doped oxide, a sulphide, a boride, and an intermetallic compound, all of which are commercially available or may be produced by a method known in the art. In certain embodiments, the crystalline semiconductor comprises one or more of a titanate, a zirconate, a molybdate, a vanadate, a technetate, a pertechnetate, a tungstate, a niobate, a tantalate, a doped tin oxide, a doped zinc oxide, a hafnate, a germanium oxide, a cobaltate, a ferrate, and a manganate, all of which are commercially available or may be produced by a method known in the art. Other crystalline semiconductors are contemplated.

In certain embodiments, the crystalline semiconductor comprises a titanate and/or a zirconate.

In certain embodiments, the crystalline semiconductor comprises one or more of strontium zirconate ($SrZrO_3$), strontium titanate ($SrTiO_3$) and a titanium oxide.

In certain embodiments, the crystalline semiconductor has one or more of the following preferred characteristics: a low electron-hole-pair recombination rate; a high mobility for electrons and holes under the influence of electric fields. a melting point of at least 250° C.; resistance to oxidation; hardness; strength, resistance to impact fracture, erosion and/or abrasion. Methods for assessing the aforementioned characteristics are known in the art.

In certain embodiments, the crystalline semiconductor comprises a band-gap of at least 2.0 ev. In certain embodiments, the crystalline semiconductor has a band-gap of at least 2.6 eV. In certain embodiments, the crystalline semiconductor has a band-gap of at least 3.1 eV. In certain embodiments, the crystalline semiconductor has a band-gap of at least 3.2 eV. In certain embodiments, the crystalline semiconductor has band gap of at least 3.4 eV. In certain embodiments, the crystalline semiconductor has a band-gap in the range from 2.6 to 5.4 eV, 3.1 to 5.4 eV, 3.2 to 5.4 eV, or 3.4 to 5.4 eV. Methods for determining the band-gap of a semiconductor are known in the art, and are typically expressed with respect to the standard hydrogen electrode.

In certain embodiments, the crystalline semiconductor has a property of high charge carrier mobility.

In certain embodiments, the semiconducting material comprises a crystalline semiconductor and the radionuclide comprises one or more of $^{90}$Sr, $^{99}$Tc, $^{3}$H, $^{14}$C, $^{63}$Ni, $^{137}$Cs, $^{147}$Pm, $^{151}$Sm, $^{121m}$Sn, $^{155}$Eu, $^{93}$Zr, $^{210}$Pb, $^{60}$Co and $^{126}$Sn. Other beta particle emitting radionuclides are contemplated.

In certain embodiments, the radionuclides are incorporated into the chemical or structural framework of the crystalline semiconductor.

In this regard, the radionuclide may be, for example, an atom that can substitute into the lattice of the crystalline semiconductor, such as $^{90}$Sr substituting for a proportion of some of the Sr in a lattice for strontium titanate ($SrTiO_3$). In another embodiment, the radionuclide may be an atom or ionic compound that can occupy a void or other structural defects in a lattice.

In certain embodiments, the radionuclides are incorporated into the crystalline semiconductor at a specific activity in the range from $10^{-1}$ GBq/mm$^3$ to $10^4$ GBq/mm$^3$. A suitable specific activity can be selected based on the desired characteristics of the electrical energy generating device.

Methods for incorporating radionuclides into a crystalline semiconductor are known in the art.

In certain embodiments, the radionuclides are incorporated into the chemical or structural framework of the crystalline semiconductor. Methods for incorporating beta particle emitting radionuclides into the chemical or structural framework of a crystalline are known in the art, and include for example isotopic exchange using isotope concentration gradients.

In certain embodiments, the radionuclides are incorporated into the chemical or structural framework of the crystalline semiconductor by one or more of the replacement of suitable atoms with the radionuclides in the lattice of the crystalline semiconductor (substitutional incorporation), by interstitial incorporation of the radionuclides into the framework of the crystalline semiconductor, or by incorporation of the radionuclides into a vacancy or void in the structural framework.

In certain embodiments, the radionuclides are incorporated into less ordered structures present in the crystalline semiconductor, such as incorporation into voids in non-regular structures present in the semiconductor.

In certain embodiments, the semiconducting material comprises the crystalline semiconductor and a binder. In certain embodiments, the semiconducting material comprises the crystalline semiconductor and a polymeric binder.

In certain embodiments, the binder material is utilised to deposit, coat or fuse the semiconducting material to at least one of the electrodes. Methods for depositing, coating or fusion of materials are known in the art.

In certain embodiments, the semiconducting material is deposited, coated or fused onto the first and/or second electrodes. In certain embodiments, the material is deposited, coated or fused onto the first electrode. In certain embodiments, the material is deposited onto the second electrode. In certain embodiments, the material is deposited onto both electrodes.

In certain embodiments, the material is deposited on, coated on, and/or fused to, one of the electrodes. Methods for depositing, coating or fusion of a material are known in the art.

In certain embodiments, the semiconducting material is in a form suitable for application to an electrode by a wet application process.

In certain embodiments, the device comprises a plurality of cells comprising an insulating layer between the cells. Insulating materials are known in the art. In certain embodiments, the insulating layer is a thin film.

In certain embodiments, the cells are electrically connected in series. In certain embodiments, the cells are electrically connected in parallel. Methods for connecting cells are known in the art.

Methods for production of an electrical generating device as described herein are known in art.

In certain embodiments, the electrical energy generating devices as described herein may be used in applications where an electrical power source is needed for long periods, such as military applications, telecommunication applications, mining applications, space applications, and in medical applications. Other applications are contemplated.

The electrical energy generating devices as described herein may also be referred to herein as "betavoltaic devices", which are generators of electric current using energy from a radioactive source emitting beta particles (electrons).

Certain embodiments of the present disclosure provide a betavoltaic device.

In certain embodiments, the present disclosure provides a betavoltaic device, the device comprising at least one cell comprising:
  first and second spaced electrodes, the first electrode comprising a low work function material and the second electrode comprising a high work function material; and
  disposed between the first and second electrodes, beta particle emitting radionuclides and a semiconducting material, the semiconducting material capable of producing electron hole pairs in response to beta particle emission from the radionuclides.

Betavoltaic devices, and methods for their production, are described herein.

Certain embodiments of the present disclosure provide a method of generating electrical energy.

Methods for generating electrical energy are as described herein.

In certain embodiments, the present disclosure provides a method of generating electrical energy, the method comprising:
  producing an electric potential difference between first and second closely spaced electrodes, the first electrode comprising a low work function material and the second electrode comprising a high work function material;
  producing electron hole pairs from energetic beta particles emitted from radionuclides in close proximity with a semiconducting material disposed between the first and second electrodes, the electron hole pairs being mobile under the effect of an electric field; and
  capturing the electron hole pairs into an external circuit using the electric field existing between the electrodes;
  thereby generating electrical energy.

In certain embodiments, the present disclosure provides a method of generating electrical energy, the method comprising:
  producing an electric field between first and second spaced electrodes, the first electrode comprising a low work function material and the second electrode comprising a high work function material, and the electric field being produced due to different Schottky junctions at the two different electrodes;
  producing electron hole pairs from energetic beta particles emitted from radionuclides in close proximity with a semiconducting material disposed between the first and second electrodes, the electron hole pairs being mobile under the effect of an electric field; and
  capturing the electron hole pairs into an external circuit using the electric field existing between the electrodes;
  thereby generating electrical energy.

In certain embodiments, the production of the electric potential difference comprises use of materials having different work functions. In certain embodiments, the first electrode comprises a low work function material and the second electrode comprises a high work function material.

Suitable first and second electrodes, and low and high work function materials, are as described herein.

Radionuclides and semiconducting materials are described herein. Examples of semiconducting materials are described herein.

Certain embodiments of the present disclosure provide a device for generating electrical energy using a method as described herein. Methods for producing a device using the method are as described herein.

Certain embodiments of the present disclosure provide a product.

In certain embodiments, the product is suitable for use in a betavoltaic device.

Figure 3:
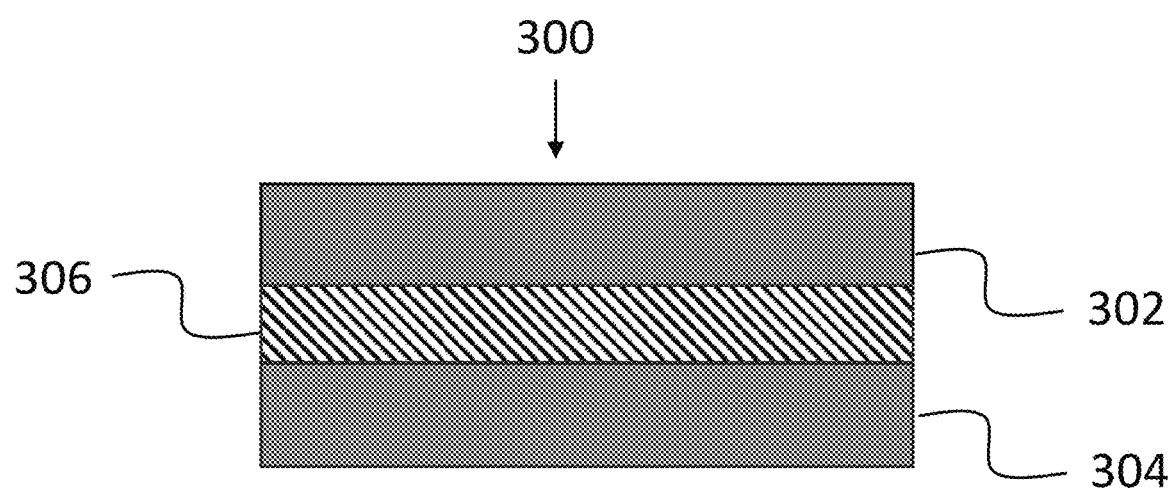
FIG. 3 shows a product and features thereof according to aspects of the present disclosure.

In certain embodiments, such as illustrated in FIG. 3, the present disclosure provides a product (300) comprising a first material (302) having a low work function, a second material (304) having a high work function, and disposed between the first material and the second material beta particle emitting radionuclides and a semiconducting material (306) capable of producing electron hole pairs in response to beta particle emission from the radionuclides.

Methods for producing the product are as described herein. Low and high work function materials are described herein. Radionuclides and semiconducting materials are described herein.

In certain embodiments, the product is used to produce an electrical cell. In certain embodiments, the product is used in an electrical generating device. Other uses are contemplated.

Certain embodiments of the present disclosure provide an electrical energy generating device comprising a product as described herein.

Methods for utilising the product in an electrical generating device are as described herein.

Certain embodiments of the present disclosure provide a method of generating electrical energy, the method comprising using a product as described herein in a device to generate the electrical energy.

Certain embodiments of the present disclosure provide a method of producing an electrical energy generating device.

In certain embodiments, the present disclosure provides a method of producing an electrical energy generating device, the method comprising incorporating one or more electrical cells into the electrical energy generating device, the one or more electrical cells comprising first and second spaced electrodes, the first electrode comprising a low work function material and the second electrode comprising a high work function material, and disposed between the first and second electrodes, beta particle emitting radionuclides and a semiconducting material, the semiconducting material capable of producing electron hole pairs in response to beta particle emission from the radionuclides.

Suitable first and second electrodes, and low and high work function materials, are described herein.

Radionuclides and semiconducting materials are described herein. Examples of semiconducting materials are described herein.

Certain embodiments of the present disclosure provide an electrical energy generating device produced by a method as described herein.

Certain embodiments of the present disclosure provide a method of producing an electrical cell for use in an electrical generating device, as describe herein.

The present disclosure is further described by the following examples. It is to be understood that the following description is for the purpose of describing particular embodiments only and is not intended to be limiting with respect to the above description.

Example 1—Production of Betavoltaic Devices Using Single Phase Composite Semiconducting Materials Non-radioactive, layered, asymmetric metal-semiconductor-metal structures were created to serve as prototype betavoltaic devices for testing under an ultraviolet (UV) photon flux. UV photons were used to simulate the electronic excitation effect provided by beta radiation, to obviate the use of radioactive material. The UV source provides photons with an energy of 4-5 eV.

The first metal layer used was a thin strip of lightly polished pure nickel metal ~150 μm thick with this layer serving as both an electrode and as a substrate for the semiconducting composite layer. The pure nickel was obtained from Mid-North Coast Components, Port Macquarie, NSW, Australia.

Two different semiconducting composite materials were prepared as distinct exemplars for the semiconductor component of the novel betavoltaic AMSM structures. The semiconducting layer is where charge carriers are generated in response to radiative excitation and a layer thickness of 2-5 μm was sought.

The first semiconducting composite material was a cesiated polyaniline-nylon composite, prepared by: (a) dissolving Nylon-6 (0.24 gram; Duromer Products, Australia) together with 0.009 gram of cesium bromide (Sigma Aldrich, 99.999%; Product #203017) in 95% formic acid (2 mL) in a glass vial and stirring the mixture at 50° C. until fully clear (~30 minutes); (b) preparing a dispersion of finely ground polyaniline (0.053 gram—emeraldine—from Aldrich; Product #428329) in formic acid (1.5 mL), by stirring the components together at 50° C. for ~20 minutes; (c) mixing the cesiated nylon solution and the polyaniline dispersion together and stirring the resulting blend for at least 20 minutes, applying gentle heat to drive off some formic acid and thus increase viscosity; (d) transferring the blended formic acid dispersion/solution of cesiated polyaniline-nylon into a small syringe fitted with a 0.45 um syringe filter; (e) drop-casting several drops of the cesiated polyaniline-nylon onto a nickel metal substrate by pushing the dispersion/solution through the syringe filter; (f) allowing the deposited fluid to spread slowly over the substrate by gently rotating the slide until nearly all formic acid had evaporated; (g) drying the film once solid, on a hotplate at ~110° C. The concentration of CsBr in the film was approximately 3 wt %.

The second semiconducting material prepared was a single-phase, fully-complexed bismuth triiodide ($BiI_3$)-nylon composite containing a high mass-loading of $BiI_3$. It was prepared by: (a) intimately mixing fine Nylon-12 powder (0.5 grams; Duromer Products, Australia) with fine $BiI_3$ powder (0.5 grams; >98%, Tokyo Chemical Industry (TCI) Product #B5787)); (b) placing the powder mixture in a vial and heating the mixture to ~150° C. to allow the $BiI_3$ to absorb into the Nylon; (c) placing the Nylon-$BiI_3$ powder on a nickel metal substrate and heating the nickel from below at ~250° C. until the materials had fully consolidated, as evidenced by the clear dark orange colour of the resulting blended polymer melt (~5 min), further demonstrating the complexation of the iodide with the amide groups of nylon; (d) allowing the melt to spread across the substrate by maintaining heat and forming it the desired thickness.

The third semiconducting composite material prepared was a composite of single phase, fully-complexed bismuth triiodide ($BiI_3$)-nylon mixture, containing a high mass-loading of $BiI_3$, with polyaniline. It was prepared by: (a) intimately mixing fine Nylon-12 powder (0.5 grams) with fine $BiI_3$ powder (0.5 grams); (b) placing the powder mixture in a vial and heating the mixture to ~150° C. to allow the $BiI_3$ to absorb into the Nylon; (c) mixing the Nylon-$BiI_3$ powder with finely ground polyaniline (0.053 gram—emeraldine-salt form) (d) placing the Nylon-$BiI_3$-polyaniline powder on a nickel metal substrate and heating the nickel from below at ~250° C. until the materials had fully consolidated, as evidenced by the clear dark orange-green colour of the resulting blended polymer-polyaniline melt (~5 min); (e) allowing the melt to spread across the substrate and pressing a polished samarium metal electrode into the melt while molten.

Figure 1:
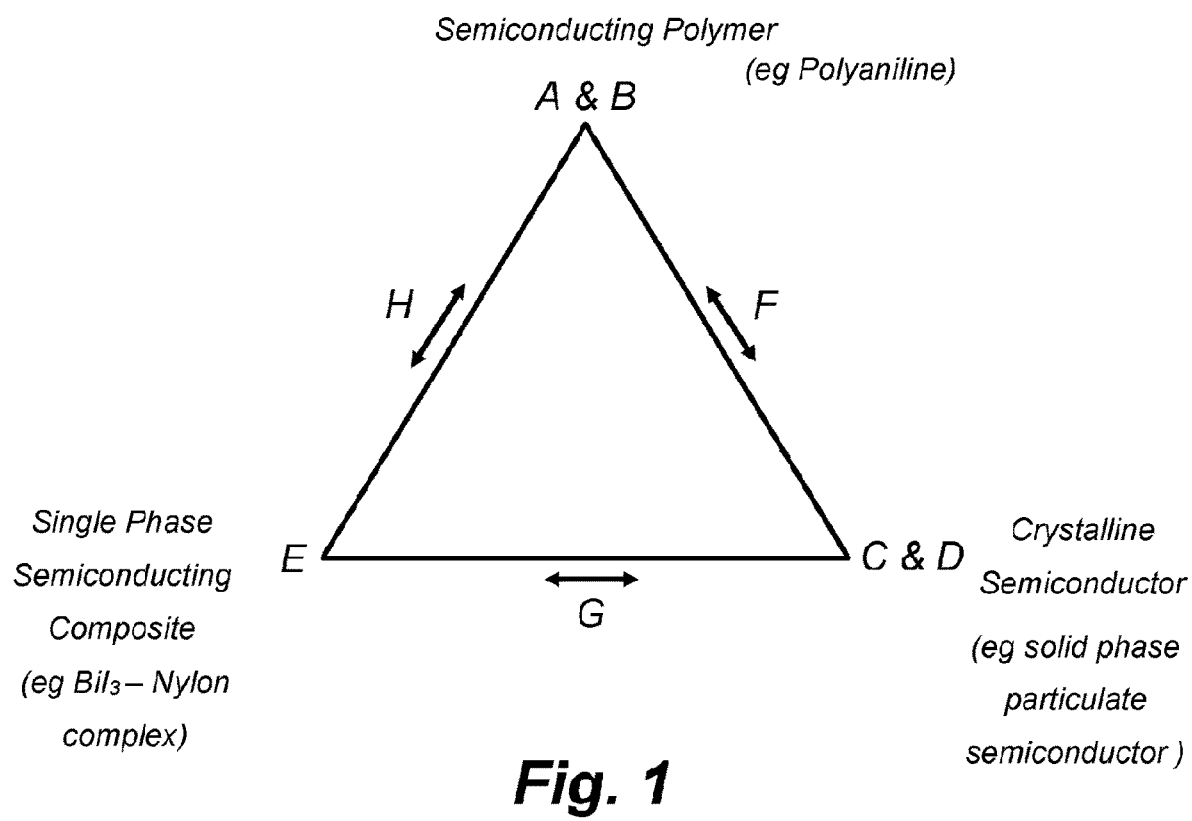
FIG. 1 shows the semiconductor material for the betavoltaic device can occupy any position within a space bounded by three end-members, namely: (i) a pure semiconducting polymer with appropriate electronic properties; (ii) a semiconducting single-phase composite comprising an inorganic compound chemically complexed with a polymer (usually containing a nitrogen &/or sulfur heteroatom); (iii) a crystalline semiconductor having a defined chemical composition and stoichiometry. The semiconductor material may comprise a mixture or blend (at nanometer scale) between any two or between all three end-members.

Each semiconducting composite exemplar occupies a different position on a three-axis compositional diagram illustrating the differing types of semiconductor material described herein (see FIG. 1). The FIGURE describes a space bounded by three end-members, namely: (i) a pure semiconducting polymer with appropriate electronic properties; (ii) a semiconducting single-phase composite comprising an inorganic compound chemically complexed with a polymer (usually containing a nitrogen &/or sulfur heteratom); (iii) a crystalline semiconductor having a defined chemical composition and stoichiometry. The semiconductor material may comprise a mixture or blend (eg at nanometer scale) between any two or between all three end-members.

For the first and second semiconducting composite materials described above, the second (low work function) metal layer comprised a thin layer of vacuum-deposited samarium metal ~150 nm thick applied within a standard vacuum deposition chamber operating at $10^{-6}$ mbar in which a crucible filled with samarium metal (Treibacher Industrie AG; Austria) was bombarded by an electron beam focussed into the center of the crucible. Thereafter a steady flux of samarium metal atoms deposited on substrates located about 20 cm directly above the crucible. At the end of the samarium metal deposition a copper metal layer (~150 nm) was applied on top of the samarium as a protective coating. The conditions for the batch type electron beam physical vapour deposition in the vacuum chamber equipped with an ion gun were as follows:

|  | Typical conditions | Ni | Sm | Cu |
|---|---|---|---|---|
| Base Pressure | <2e-5 mbar |  |  |  |
| Run Pressure | ~1e-4 mbar |  |  |  |
| Ion Gun | yes |  |  |  |
| Substrate heater | Yes @ 100° C. |  |  |  |
| Thickness | 100 nm |  |  |  |
| Rate |  | 2 Å/s | 10 Å/s | 1.5 Å/s |

Before samples were assessed, a small region on the copper-face samarium electrode was lightly abraded away using a 3000 grit emery paper until the dark colour of the central semiconductor was just visible, to allow a reasonable fluence of the UV photons to penetrate into the semiconducting layer.

Simulated betavoltaic current measurements were carried out by connecting the finished devices in series to a Keysight 6½ digit multimeter (Model 34465A) operating in DC ammeter mode at its 1 μA range with a resolution of 500 picoAmps. Flat connection clips ensured a good electrical contact with both the high work function and low work function electrodes. A baseline thermal current was detectable in most samples, indicating that they were not short circuited, and were thus suitable for further examination. The UV photon beam (500 mW power) was directed at the abraded part of the electrode surface. The current reading on the ammeter jumped immediately and continued to climb. The value recorded was that immediately (~1 second) following the moment the UV beam met the sample. The results are shown in Table 1.

TABLE 1

|  | Baseline Current (μA) | Instantaneous Excitation Current (μA) |
|---|---|---|
| Polyaniline-Ny6 (15%) composite: thick, polished, non-cesiated, on Cu | 0.0040 | 0.00600 |
| BiI$_3$-Nylon12 composite (~50% ww Bi) fixed between small Sm and Ni metal tabs | 0.2300 | 0.37000 |
| PANI PPS-Nylon680 composite thin film 1 | 0.0050 | 0.02100 |
| PANI PPS-Nylon680 composite thin film 2 | 0.0180 | 0.134000 |
| PANI PPS-Nylon680 composite thin film 3 | 0.0040 | 0.22000 |
| PANI-tosylate -Nylon680 composite thick film 1 | 0.0060 | 0.23000 |
| PANI-tosylate -Nylon680 composite thick film 2 - no CsBr | 0.0085 | 0.1800 |
| PANI-tosylate -Nylon680 composite thick film 2 - ~2.5% CsBr | 0.00400 | 0.0200 |

As can be seen from Table 1, appreciable instantaneous UV-stimulated currents were measured from each of the prototype betavoltaic structures tested in the experiment. The induced currents immediately following the start of UV irradiation are relevant in the context of betavoltaic response, because they are entirely due to charge-carriers produced by electronic excitation, whereas current levels at later times can contain a thermally-induced current component as heat gradually accumulates in the sample. While it was not possible to measure thermal current production in this experiment, it is likely that the currents reported in the second column of Table 1 underestimate the amount of charge carrier generation and collection arising from the type of electronic excitation that is similar to that created by beta-radiation, since there is likely to be a majority electronic current component to the total current, even later than 1 sec after the UV irradiation commences.

The key deduction that can be made from these experiments is that the electric field collecting the charge carriers must be appreciable in order that they are swept into the external circuit before recombining. This means, in turn, that the differing metal-semiconductor junctions at the samarium (low work function) and nickel/copper (high work function) electrodes are sufficient in strength, polarity and spatial extent for this to occur.

Example 2—Production of a Betavoltaic Device by Incorporation of a Radionuclide into a Polymer by Exchange A first electrode made of samarium metal (eg 99.9%) may be produced by utilizing a samarium foil/plate of thickness of appropriate thickness, for example in the range from 0.01 to 0.4 mm, commercially available for example from Sigma-Aldrich (catalogue #693731). The metal foil/plate may be used in a suitable size, for example 20 to 40 mm length×20 to 40 mm height. An example of a samarium metal electrode produced is described in Example 1.

A second electrode made of nickel metal (eg 99.6%) may be produced by utilizing a foil/plate of appropriate thickness, for example in the range from 0.01 to 0.4 mm, commercially available for example from Baoji TST Non-ferrous Metal Co., Ltd. The metal foil/plate may be used in a suitable size, for example 20 to 40 mm length×20 to 40 mm height. An example of a nickel metal electrode produced is described in Example 1.

Tritium ($^3$H) is a beta-emitting radioisotope produced in large amounts as a byproduct of certain nuclear power reactors and as a waste from other nuclear processing operations. Hundred gigabecquerel amounts of tritium may be provided in gaseous form (T$_2$) at high pressure at a number of tritiating facilities (eg, Canadian Nuclear Laboratories, Chalk River, Ontario), or can be provided in other chemical forms (eg T$_2$O).

An inorganic semiconductor, for example $BiI_3$, may be obtained commercially, for example from Alfa, Ward Hill Massachusetts (99.999% pure, recrystallised from tetrahydrofuran under $N_2$).

A matrix polymer, such as nylon-11 [NH—CO—$(CH_2)_{10}$—]$_n$, may be obtained commercially. The presence of the polyamide moitey in the polymer leads in some cases to strong interactions with iodine atoms that may be part of inorganic semiconductors such as $BiI_3$, and these interactions help solubilise the inorganic component in the polymer, as demonstrated in Example 1.

A $BiI_3$-nylon-11 composite may be produced as described in Example 1 or by use of a melt of nylon-11 (previously dried under vacuum at 150° C. to remove moisture) at 200° to 240° C. under $N_2$ for 5 to 15 min to give a dark orange solution, containing for example approximately 65%-75% by weight of $BiI_3$.

The $^3H$ radionuclide may be incorporated into the polymer by use of a special tritiation chamber operated at elevated temperature and pressure to facilitate hydrogen-tritium exchange in the polymer matrix. The composite may then be deposited onto the heated first and/or second electrodes using a process such as by drop-casting to produce a coating of approximately 1 to 30 micrometres after cooling.

The first and second electrodes are then brought into close proximity (eg 1 to 30 micrometres), and so that the electrodes are largely parallel.

A betavoltaic electrical energy generating device using a single cell is then produced by completing the circuit (with a small resistive load) between the first and second electrodes. To produce a multi-cell electrical energy generating device, multiple cells using a first electrode, a second electrode and a coating applied to either the electrodes may then be produced. In this case, a thin insulating layer is located in between individual cells and the first and second electrodes of each cell connected in serial or parallel.

The electrical energy generating device described above is envisaged to have a number of advantages. For example, the device will create electrical energy for an extended period of time reflecting the useable lifespan of the radionuclide used to power the device. The device will have resistance to radiation damage and also to the heat generated by the decay of the radionuclide.

Example 3—Production of a Betavoltaic Device by Incorporation of a Radionuclide into a Polymer Using Labelled Monomers A First electrode made of samarium metal (eg 99.9%) may be produced by utilizing a samarium foil/plate of thickness of appropriate thickness, for example in the range from 0.01 to 0.4 mm, commercially available for example from Sigma-Aldrich (catalogue #693731). The metal foil/plate may be used in a suitable size, for example 20 to 40 mm length×20 to 40 mm height. An example of a samarium metal electrode produced is described in Example 1.

A second electrode made of nickel metal (eg 99.6%) may be produced by utilizing a foil/plate of appropriate thickness, for example in the range from 0.02 to 0.4 mm, commercially available for example from Baoji TST Non-ferrous Metal Co., Ltd. The metal foil/plate may be used in a suitable size, for example 20 to 40 mm length×20 to 40 mm height. An example of a nickel metal electrode produced is described in Example 1.

An inorganic semiconductor, for example $PbI_2$, may be obtained commercially, for example from Sigma-Aldrich (99.999% pure).

An insulating polymer, such as nylon-11 [NH—CO—$(CH_2)_{10}$—]$_n$, which has been labelled with a $^3H$ or $^{14}C$ radionuclide may be obtained. For example, for nylon-11, the polymer may be labelled using $^3H$ and $^{14}C$ incorporated into the monomer 11-amino undecanoic acid, and the polymer produced by polymerization of the labelled monomer using standard synthetic conditions.

A $PbI_2$-nylon-11 composite may be produced in a melt of labelled nylon-11 (previously dried under vacuum at 150° C. to remove moisture) at 220° to 290° C. under $N_2$ to give a thick, clear, orange solution, containing for example approximately 65% by weight of $PbI_2$. This produces a $PbI_2$-$^3H$ or $^{14}C$ nylon-11 composite. The solution may then be deposited onto heated first and/or second electrodes using a polymeric film application process such as sheet extrusion to produce a coating of approximately 1 to 30 micrometres after cooling.

The first and second electrodes are then brought into close proximity (eg 1 to 50 micrometres) and so that the electrodes are largely parallel.

A betavoltaic electrical energy generating device using a single cell is then produced by completing the circuit (with a small resistive load) between the first and second electrodes. To produce a multi-cell electrical energy generating device, multiple cells using a first electrode, a second electrode and a coating applied to either the electrodes may then be produced. In this case, a thin insulating layer is located in between individual cells and the first and second electrodes of each cell connected in serial or parallel.

The electrical energy generating device described above is envisaged to have a number of advantages. For example, the device will create electrical energy for a period of time reflecting the useable lifespan of the radionuclide used to power the device. The materials will be resistant toward radiation damage and also provide resistance against heat generated by the decay of the radionuclides.

Example 4—Production of a Betavoltaic Device Using a Crystalline Semiconductor

A first electrode made of samarium metal (99.9%) may be produced by utilizing a samarium foil/plate of appropriate thickness, for example in the range from 0.02 to 0.4 mm, commercially available for example from Sigma-Aldrich (catalogue #693731). The metal foil/plate may be used in a suitable size, for example 20 to 40 mm length×20 to 40 mm height.

A second electrode made of nickel metal (99.6%) may be produced by utilizing a nickel foil/plate of appropriate thickness, for example in the range from 0.02 to 0.4 mm, commercially available for example from Baoji TST Non-ferrous Metal Co., Ltd. The metal foil/plate may be used in a suitable size, for example 20 to 40 mm length×20 to 40 mm height.

A semiconducting charge-carrier collector material in the form of a thin slab may be used. For example, strontium titanate ($SrTiO_3$) may be doped with a suitable source of $^{90}Sr$ (eg ($^{90}Sr,^{nat}Sr)CO_3$, of specific activity 500 GBq/g) with powered, inactive $SrCO_3$ and powdered $TiO_2$. The mixtures may be ball-milled in ethanol medium using yttria-stabilized zirconia balls in a plastic container for 24 h. The slurry may then be dried, ground, sifted (100 mesh) and calcined for a suitable time at a suitable temperature, for example in the range of 1000° C. to 1200° C. for 2 h. Then the calcined powders may be ball-milled again, dried and ground into fine powder and then a solution of 3 wt % poly (vinyl alcohol) 1799 (PVA) (alcoholysis 99.8100% (mol/ mol), Aladdin Industrial Co.) added dropwise to the dried powders as a binding agent. The mixture may then be coated on the first or second electrode using a wet application process such as by spin coating and dried to produce a coating of approximately 1 to 50 micrometres.

Strontium 90 ($^{90}Sr$), a beta particle emitting radionuclide, may be obtained as a radioactive waste product in the form of $^{90}SrCO_3$.

$SrCO_3$ may be obtained commercially, for example from Sinopharm Chemical Reagent Co. Ltd in powdered form.

$TiO_2$ may be obtained commercially, for example from Sinopharm Chemical Reagent Co. Ltd in powdered form.

The first and second electrodes (one of which is coated) are then brought into close proximity (eg 1 to 50 micrometres) and so that the electrodes are largely parallel.

A betavoltaic electrical energy generating cell is then produced by completing the circuit (with a small resistive load) between the first and second electrodes. To produce a multi-cell electrical energy generating device, multiple cells using a first electrode, a second electrode and a coating applied to either the electrodes may then be produced. In this case, a thin insulating layer is located in between individual cells and the first and second electrodes of each cell connected in serial or parallel.

The electrical energy generating device described above is envisaged to have a number of advantages. For example, the device will create electrical energy for an extended period reflecting the useable lifespan of the radionuclide used to power the device. The materials used in the device will be resistant to radiation damage and also provide resistance against heat generated by the decay of the radionuclide.

Example 5—Preparation of a Tritiated Semiconducting Polymer

A tritiated polyaniline polymer with the desired semiconductive properties may be prepared by two methods. Methods for preparing polyaniline are known in the art, for example as described in Boeva and Sergeyev (2014) "Polyaniline: Synthesis, Properties and Application" *Polymer Science, Ser. C* 56: 144-153.

In one example, polyaniline may be prepared by chemical polymerization of aniline using ammonium persulphate, for example as described in J. Stejskal and R. G. Gilbert, *Pure Appl. Chem.* 74, 857 (2002). The $^3H$ radionuclide may be incorporated into the polymer by use of a special tritiation chamber operated at elevated temperature to facilitate hydrogen-tritium exchange in the polymer matrix.

In another example, polyaniline with the desired conductive properties may be prepared by chemical polymerization of aniline labelled $^3H$ or $^{14}C$ radionuclide and ammonium persulphate, for example as described in J. Stejskal and R. G. Gilbert, *Pure Appl. Chem.*

Although the present disclosure has been described with reference to particular examples, it will be appreciated by those skilled in the art that the disclosure may be embodied in many other forms.

It is to be understood that various alterations, additions and/or modifications may be made to the parts previously described without departing from the ambit of the present disclosure, and that, in the light of the above teachings, the present disclosure may be implemented in software, firmware and/or hardware in a variety of manners as would be understood by the skilled person.

As used herein, the singular forms "a," "an," and "the" may refer to plural articles unless specifically stated otherwise.

Throughout this specification, unless the context requires otherwise, the word "comprise", or variations such as "comprises" or "comprising", will be understood to imply the inclusion of a stated element or integer or group of elements or integers but not the exclusion of any other element or integer or group of elements or integers.

All methods described herein can be performed in any suitable order unless indicated otherwise herein or clearly contradicted by context. The use of any and all examples, or exemplary language (e.g., "such as") provided herein, is intended merely to better illuminate the example embodiments and does not pose a limitation on the scope of the claimed invention unless otherwise claimed. No language in the specification should be construed as indicating any non-claimed element as essential.

The description provided herein is in relation to several embodiments which may share common characteristics and features. It is to be understood that one or more features of one embodiment may be combinable with one or more features of the other embodiments. In addition, a single feature or combination of features of the embodiments may constitute additional embodiments.

The subject headings used herein are included only for the ease of reference of the reader and should not be used to limit the subject matter found throughout the disclosure or the claims. The subject headings should not be used in construing the scope of the claims or the claim limitations.

Future patent applications may be filed on the basis of the present application, for example by claiming priority from the present application, by claiming a divisional status and/or by claiming a continuation status. It is to be understood that the following claims are provided by way of example only, and are not intended to limit the scope of what may be claimed in any such future application. Nor should the claims be considered to limit the understanding of (or exclude other understandings of) the present disclosure. Features may be added to or omitted from the example claims at a later date.

The invention claimed is:

1. An electrical energy generating device, the device comprising at least one cell comprising:
   first and second spaced electrodes, the first electrode comprising a low work function material and the second electrode comprising a high work function material; and
   disposed between the first and second electrodes, beta particle emitting radionuclides and a single phase composite semiconducting material in the form of an inorganic semiconductor chemically complexed with an organic polymer, the inorganic semiconductor having a band-gap of at least 1.1 eV, the single phase composite semiconducting material capable of producing electron hole pairs in response to beta particle emission from the beta particle emitting radionuclides,
   wherein the beta particle emitting radionuclides are incorporated into the chemical structure of the single phase composite semiconducting material.

2. The electrical energy generating device according to claim 1, wherein the radionuclides comprise one or more of $^{90}Sr$, $^{99}Tc$, $^3H$, $^{14}C$, $^{63}Ni$, $^{137}Cs$, $^{147}Pm$, $^{151}Sm$, $^{155}Eu$, $^{93}Zr$, $^{126}Sn$, $^{60}Co$, $^{210}Pb$, $^{90}Y$, $^{129}I$, $^{188}W$, $^{35}S$, $^{123}Sn$, $^{45}Ca$, $^{106}Ru$, $^{170}Tm$, $^{171}Tm$, $^{134}Cs$, $^{32}Si$, $^{113}Cd$, and $^{79}Se$.

3. The electrical energy generating device according to claim 1, wherein the low work function material comprises a metal, an intermetallic compound, or a metal containing compound.

4. The electrical energy generating device according to claim 3, wherein the metal, the intermetallic compound, or the metal containing compound comprises one or more of europium, strontium, barium, samarium, dysprosium, neodymium, gadolinium, terbium, holmium, erbium, thulium, lanthanum, scandium, thorium, calcium, magnesium, cerium, yttrium, ytterbium, sodium, lithium, potassium, rubidium, and cesium.

5. The electrical energy generating device according to claim 1, wherein the low work function material comprises samarium metal.

6. The electrical energy generating device according to claim 1, wherein the high work function material comprises a metal and/or intermetallic compound.

7. The electrical energy generating device according to claim 1, wherein the high work function material comprises a metal selected from one or more of nickel, platinum, silver, gold, aluminium, cobalt, chromium, copper, beryllium, bismuth, cadmium, iron, gallium, germanium, mercury, indium, iridium, manganese, molybdenum, niobium, osmium, lead, palladium, rhenium, rhodium, ruthenium, antimony, silicon, tin, tantalum, technetium, titanium, vanadium, tungsten, zinc and zirconium.

8. The electrical energy generating device according to claim 1, wherein the high work function material comprises nickel metal.

9. The electrical energy generating device according to claim 1, wherein the radionuclides are dispersed in the single phase composite semiconducting material.

10. The electrical energy generating device according to claim 1, wherein the single phase composite semiconducting material further comprises a crystalline semiconductor.

11. A method of generating electricity, the method comprising using an electrical generating device according to claim 1.

12. A method of generating electrical energy, the method comprising:
producing an electric potential difference between first and second closely spaced electrodes, the first electrode comprising a low work function material and the second electrode comprising a high work function material;
producing electron hole pairs from energetic beta particles emitted from radionuclides in close proximity with a single phase composite semiconducting material disposed between the first and second electrodes, the single phase composite semiconducting material in the form of an inorganic semiconductor chemically complexed with an organic polymer, the inorganic semiconductor having a band-gap of at least 1.1 eV, and the electron hole pairs being mobile under the effect of an electric field;
wherein the radionuclides are incorporated into the chemical structure of the single phase composite semiconducting material and
capturing the electron hole pairs into an external circuit using the electric potential difference existing between the electrodes;
thereby generating electrical energy.

13. A product comprising a first material having a low work function, a second material having a high work function, and disposed between the first material and the second material beta particle emitting radionuclides and a single phase composite semiconducting material capable of producing electron hole pairs in response to beta particle emission from the beta particle emitting radionuclides, the single phase composite semiconducting material in the form of an inorganic semiconductor chemically complexed with an organic polymer, the inorganic semiconductor having a band-gap of at least 1.1 eV;
wherein the beta particle emitting radionuclides are incorporated into the chemical structure of the single phase composite semiconducting material.

14. An electrical energy generating device comprising the product according to claim 13.

15. A method of producing an electrical energy generating device, the method comprising incorporating one or more electrical cells into the electrical energy generating device, the one or more electrical cells comprising first and second spaced electrodes, the first electrode comprising a low work function material and the second electrode comprising a high work function material, and disposed between the first and second electrodes, beta particle emitting radionuclides and a single phase composite semiconducting material in the form of an inorganic semiconductor chemically complexed with an organic polymer, the inorganic semiconductor having a band-gap of at least 1.1 eV, the single phase composite-semiconducting material capable of producing electron hole pairs in response to beta particle emission from the beta particle emitting radionuclides;
wherein the beta particle emitting radionuclides are incorporated into the chemical structure of the single phase composite semiconducting material.

16. An electrical energy generating device produced by the method of claim 15.

* * * * *